United States Patent [19]

Kuhlman et al.

[11] Patent Number: 4,856,589

[45] Date of Patent: Aug. 15, 1989

[54] GAS FLOODING WITH DILUTE SURFACTANT SOLUTIONS

[75] Inventors: Myron I. Kuhlman; John K. Borchardt, both of Houston; Andrew H. Falls, Sugarland, all of Tex.

[73] Assignee: Shell Oil Company, Houston, Tex.

[21] Appl. No.: 238,634

[22] Filed: Aug. 30, 1988

[51] Int. Cl.$^4$ ............................................. E21B 43/22
[52] U.S. Cl. ................................... 166/273; 166/274; 166/309; 166/268; 252/8.554
[58] Field of Search ............ 166/268, 273, 274, 305.1, 166/309; 252/8.554

[56] References Cited

U.S. PATENT DOCUMENTS

| | | |
|---|---|---|
| 3,065,790 | 11/1962 | Holm . |
| 3,318,379 | 5/1967 | Bond et al. . |
| 3,342,256 | 9/1967 | Bernard et al. . |
| 3,442,332 | 5/1969 | Keith .................................... 166/266 |
| 3,529,668 | 9/1970 | Bernard ................................ 166/273 |
| 4,248,301 | 2/1981 | Suffridge ............................. 166/252 |
| 4,360,061 | 11/1982 | Canter et al. ........................ 166/274 |
| 4,380,266 | 4/1983 | Wellington .......................... 166/252 |
| 4,427,067 | 1/1984 | Stone .................................... 166/274 |
| 4,458,759 | 7/1984 | Isaacs et al. ......................... 166/272 |
| 4,461,696 | 4/1983 | Bock et al. ..................... 208/11 LE |
| 4,502,538 | 5/1985 | Wellington et al. ................. 166/252 |
| 4,540,050 | 9/1985 | Huang et al. .................... 166/309 X |
| 4,576,232 | 3/1986 | Duerksen et al. ................... 166/274 |
| 4,577,688 | 3/1986 | Gassmann et al. ................. 166/245 |
| 4,676,316 | 6/1987 | Mitchell .............................. 166/274 |
| 4,706,750 | 11/1987 | Buckles ............................... 166/271 |
| 4,715,444 | 12/1987 | MacAllister et al. ............... 166/269 |
| 4,736,795 | 4/1988 | Karas .................................. 166/274 |
| 4,768,592 | 9/1988 | Perkins ........................... 166/294 X |

OTHER PUBLICATIONS

SPE 14394, "Surfactants for $CO_2$ Foam Flooding", J. K. Borchardt, D. B. Bright, M. K. Dickson, and S. L. Wellington, Sep. 22–25, 1985.

SPE 14393, "CT Studies of Surfactant-Induced $CO_2$ Mobility Control", S. L. Wellington, H. J. Vinegar, Sep. 22–25, 1985.

SPE/DOE 17363, "Laboratory Measurements of $CO_2$-Foam Mobility", H. O. Lee, J. P. Heller, Apr. 17–20, 1988.

Primary Examiner—George A. Suchfield

[57] ABSTRACT

A gas flooding process for displacing oil within a reservoir is improved by injections of a surfactant having a composition and concentration correlated with those of the brine used to remain substantially within the water phase of the injected fluid at a concentration below the critical micelle concentration of the surfactant.

43 Claims, 7 Drawing Sheets

GAS FLOODING WITH DILUTE SURFACTANT SOLUTIONS

BACKGROUND OF THE INVENTION

This invention concerns surfactant-enhanced gas flooding operations where a dilute surfactant solution and a gas are used to displace and recover hydrocarbons from within a subterranean reservoir. The invention is particularly applicable to gas flooding operations where carbon dioxide is injected in alteration with an aqueous fluid, such as water or brine.

A variety of techniques have been used to enhance the recovery of hydrocarbons from subterranean reservoirs in which the hydrocarbons no longer flow by natural forces. One such technique is water injection, or water flooding, to force hydrocarbons from the subterranean reservoir by flowing water through the formations. While water injection has been effective in many instances, only about a third of the hydrocarbons are recovered after application of this technique. The water bypasses much of the oil due to a combination of natural fractures, permeability variations, and fluid mobility differences. Trapping of oil by capillary forces at small pore throats also reduces recovery.

Another technique is the use of gas injection, which functions to force hydrocarbons from the subterranean formation. Gas flooding for oil recovery is frequently used subsequent to water flooding. A typical method of gas flooding utilizes recycled reservoir gases, reinjecting at the injection well at least a portion of those gases produced at the production well. To enhance the effectiveness of gas flooding, a miscible gas may be used to swell and reduce the viscosity of oil present in the formation. Carbon dioxide, which acts as a solvent to reduce viscosity of the crude oil, is one of the most effective, and least expensive, miscible gases. A gas flooding process which involves using carbon dioxide obtained by processing some of the crude oil produced from the reservoir is disclosed in U.S. Pat. No. 3,442,332.

Due to the low viscosity of gas, it will finger or flow through the paths of least resistance, thus bypassing significant portions of the formation, and causing early breakthrough at the production well. Also, due to its low density, the injected gas tends to rise to the top of the formation and "override" portions of the formation. The mobility of the injected gas, combined with variations in reservoir permeability, often results in an irregular injection profile, which provides lower hydrocarbon recovery efficiencies. A variety of techniques may be used to improve injection profile, and thereby to improve recovery efficiencies. A process for improving the gas injection profile, and the vertical sweep efficiency of a gas flooding operation, is described in U.S. Pat. No. 4,715,444.

The economics of recovering hydrocarbons using carbon dioxide can be greatly increased if the carbon dioxide is used in slug form and driven through the reservoir by an aqueous drive fluid, such as water, brine, or carbonated water. A process using this technique is disclosed in U.S. Pat. No. 3,065,790. Injection of carbon dioxide as a supercritical fluid has become the preferred method for carbon dioxide flooding operations, since it is more effective for oil recovery than carbon dioxide in the gaseous form. In a formation that has previously been water flooded, use of a carbon dioxide water-alternate-gas (WAG) injection process may provide additional oil recovery. However, only the oil actually contacted by the injected gas will be recovered, and bypassed oil will remain in the reservoir. A method to optimize well spacing and injection rates to achieve maximum recovery is described in U.S. Pat. No. 4,427,067.

It has been suggested that the overall efficiency of a gas or WAG flooding secondary recovery process can be improved by including a foaming agent or surfactant. The surfactant or foaming agent can be introduced directly into the reservoir by means of a water or brine vehicle prior to injection of the gas. The surfactant or foaming agent should have sufficient foaming ability and stability to satisfactorily reduce mobility of the gas, thereby reducing its tendency to channel through highly permeable fissures, cracks, or strata, and directing it toward previously unswept portions of the formation. These surfactants should be chemically and thermally stable under reservoir conditions. A process for improving the reservoir sweep efficiency of a gas flooding process by injecting a surfactant to form a foam in-situ is revealed in U.S. Pat. No. 3,342,256. The use of a polymer in combination with a surfactant, has also been proposed to improve the efficiency of a gas flooding operation, as is described in U.S. Pat. No. 4,676,316. Information on the use of surfactants in carbon dioxide flooding operations may be found in two papers published in 1985 by the Society of Petroleum Engineers: "CT Studies of Surfactant-Induced $CO_2$ Mobility Control" by Wellington et al (SPE 14393) and "Surfactants for $CO_2$ Foam Flooding" by Borchardt et al (SPE 14394).

Surfactant-induced carbon dioxide foam is a promising method for reducing carbon dioxide mobility in the reservoir. When this technique is utilized, foam will be formed in the more highly permeable strata within the immediate vicinity of the injection well, rather than in the less permeable zones, since the solution will take the path of least resistance. The carbon dioxide subsequently injected will more readily penetrate the previously less permeable strata because of the mobility reduction created by foam in the highly permeable zones. Carbon dioxide mobility can be adjusted through surfactant concentration and gas/liquid injection ratios.

A primary disadvantage of using surfactants to affect a large reservoir in a gas flooding operation is the substantial cost of surfactants. Another disadvantage is the reduction in fluid injectivity which results if a strong foam is formed in the reservoir, and the consequent delay in oil production. It is an object of this invention to provide an improved surfactant-enhanced gas flooding oil recovery process by which greater quantities of oil can be produced faster, with smaller amounts of surfactants. Another object of this invention is to provide an improved surfactant-enhanced gas flooding process which achieves sweep efficiencies comparable to those described in typical surfactant-enhanced gas flooding operations while maintaining adequate fluid injectivity. It is another object of this invention to more effectively utilize the surfactant used in a surfactant-enhanced gas flooding enhanced oil recovery process.

SUMMARY OF THE INVENTION

This invention relates to surfactant-enhanced gas flooding operations where a dilute surfactant solution and a gas are used to displace and recover hydrocarbons from within a subterranean reservoir. The dilute surfactant solution contains a surfactant that is present at a concentration that is less than its critical micelle concentration (CMC). At this concentration, the surfactant propagates more effectively, while still providing adequate mobility control, such that smaller total quantities of surfactant are required. Consequently, this technique has the potential to significantly reduce the cost of surfactant-enhanced gas flooding operations. The invention is particularly applicable to a gas flooding operation known as water-alternate-gas (WAG), where gases are injected in alternation with an aqueous fluid, such as water or brine. Under some circumstances, the use of dilute surfactant solutions may be combined with use of more concentrated surfactant solutions, where the surfactant is present at more than its CMC. The process may also be applied in carbonated water flooding operations. While the invention is not specifically designed for steam flooding of light oil reservoirs, the principles revealed herein apply to that process as well. A preferred application of the process is in carbon dioxide flooding WAG operations. The present invention also relates to the surfactants, structured to have high CMC values, that are described herein.

DETAILED DESCRIPTION OF THE INVENTION

Figure 2:
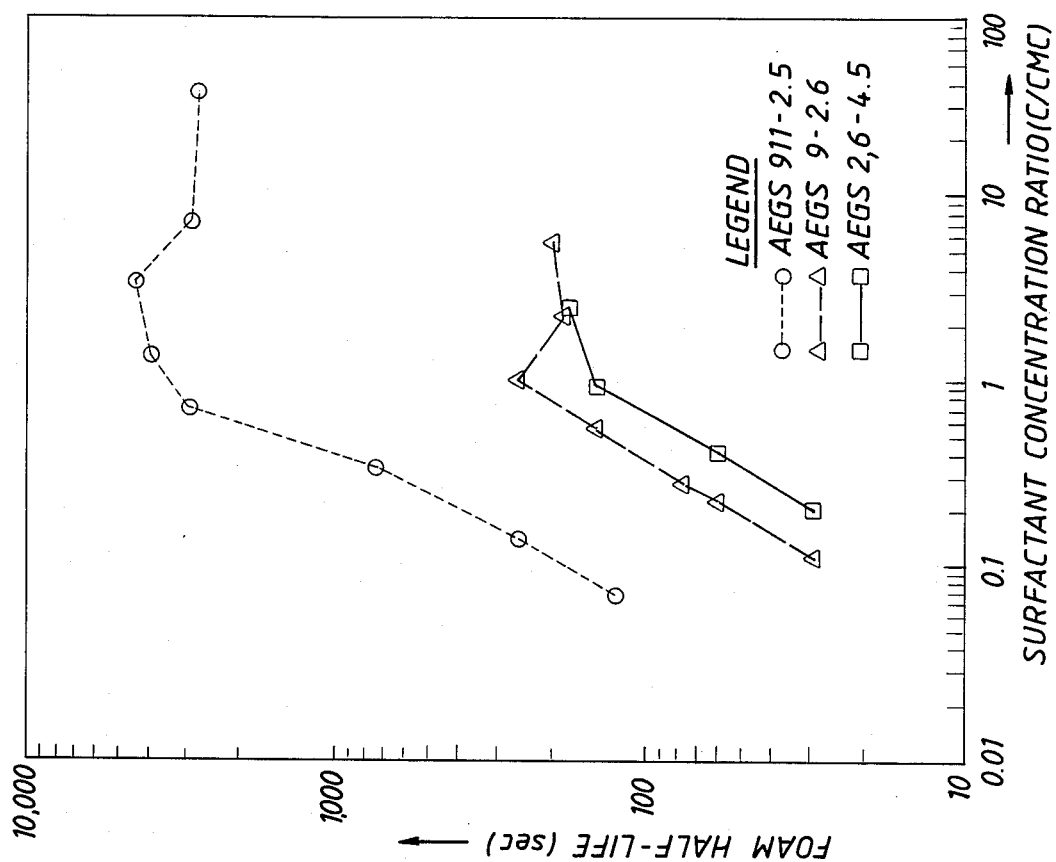
FIG. 2 illustrats the effect of hydrophobe length on CMC and foam stability.

The application of surfactants to the enhanced oil recovery field, and to gas-flooding operations is widely known. However, because of the high unit cost of surfactants and the large quantities required to achieve acceptable results, the commercial use of surfactants is often prohibited by economics. In the past, it has been assumed that acceptable results can be obtained with a surfactant only when the surfactant is used at greater than its critical micelle concentration (CMC), the concentration at which the surfactant monomers start to form aggregates, or micelles.

The following publications are cited in support of this philosophy. U.S. Pat. No. 4,248,301 describes an enhanced oil recovery process that employs a micellar fluid formed with sulfonate surfactant components that are substantially oil soluble. The invention is limited to micellar fluids wherein the surfactant is present in an amount greater than its CMC. U.S. Pat No. 4,461,696 describes a shale oil recovery process in which a surfactant is employed to extract organic materials from a treated oil shale residue. The disclosure specifies that a microemulsion, in which surfactants are present at greater than their CMC values must be used for the extraction step. U.S. Pat. No. 4,360,061 describes an enhanced oil recovery process which employs a polymer-microemulsion complex. The disclosure specifies that surfactants are present in the microemulsion at greater than their CMC. U.S. Pat. No. 4,458,759 describes an improved steam flooding process in which the steam is superheated and contains a volatilized surfactant as an aerosol through the reservoir. The reference notes that to maximize the effectiveness of the surfactant, the surfactant concentration in the steam should be above the critical micelle concentration at the process conditions of temperature and pressure. U.S. Pat. No. 4,736,795 describes a gas flooding process employing a variety of surfactants. The disclosure notes that the surfactant concentration is preferably in excess of its CMC.

In the past, it has also been assumed that, to achieve acceptable results in surfactant-enhanced gas flooding operations, it is necessary to form a strong, stable foam, which occurs when the surfactant is present at greater than its CMC. The following publications are cited in support of this philosophy. In a paper published in 1988 by the Society of Petroleum Engineers, "Laboratory Measurements of $CO_2$ Foam Mobility," by H. O. Lee and J. P. Heller (SPE 17363), the authors note that a critical surfactant concentration, which is well above the CMC, is required to minimize gas mobility in a carbon dioxide flooding operation. This critical concentration is defined as the point below which no significant mobility reduction can be obtained. U.S. Pat. No. 3,318,379 describes a surfactant-enhanced flooding process where the surfactant is displaced out from the well such that foam forms away from the near wellbore region of the reservoir, and adequate fluid injection levels can be maintained. It is noted that the preferred surfactants will form a "stable" foam, and that application of the invention will result in the formation of a "tenacious" foam bank in the reservoir. U.S. Pat. No. 3,529,668 describes a foam drive process in which a bank of foam is established in and displaced through the reservoir. It is noted that the preferred surfactants form a "stable" foam at concentrations of 0.01 to 10 wt%. U.S. Pat. No. 4,576,232 describes a gas-foam drive process where a foamable mixture of gas and surfactant solution is injected into and displaced through the reservoir. It is noted that the more desirable surfactants are those which "create a foam that strongly inhibits the flow of gas."

It has recently been recognized that formation of a strong foam can result in a fluid injectivity too low to allow an effective recovery operation. U.S. Pat. No. 4,706,750 describes a $CO_2$ foam drive process wherein horizontal fractures are formed at the injection well prior to injection of $CO_2$ and surfactant to allow the $CO_2$ foam to more effectively penetrate the formation. The present invention provides another solution to this injectivity problem.

It has now been determined that acceptable injectivity levels can be maintained through the use of surfactants in dilute concentrations, at less than their CMC, where the surfactant is properly selected. Since smaller total quantities of surfactant are required to practice this invention, it has the potential to significantly reduce the cost of such recovery operations. Through use of the present invention, a surfactant-enhanced gas flooding operation, with selected surfactants used at less than their CMC, mobility of the injected gas is reduced, and sweep efficiency is maintained, in an economic fashion.

The criteria used in the past for selecting or screening surfactants have been foaming or emulsion tests at one atmosphere and reservoir temperature, elevated pressure emulsion tests at reservoir temperature, or foam core floods in which generating a large pressure drop across the core is considered a measure of success. These criteria only consider the formation of a strong foam suitable for reducing the fluid gas mobility, and strong emulsifying properties, and do not consider a number of important factors critical to the success of a field operation. The strong foaming surfactant is present above its CMC, emulsifies crude oil about as much as it does the injected fluid, and causes low oil mobility, resulting in low oil recovery.

It has now been determined that although foam strength is an important consideration, it is not necessary, or desirable, for the surfactant to form a strong foam. Although a surfactant injected at a concentration less than its CMC forms a weaker foam than one injected at a concentration greater than its CMC, the surfactant also propagates more quickly through the reservoir. A surfactant of the present invention will not be an excellent foaming agent based on standard screening and selection criteria, but the surfactant used below its CMC will form a foam of adequate strength and will not reduce injectivity to unacceptably low levels. While it is surprising that a surfactant which is designed to be a poor foamer reduces mobility enough to be useful, it has been found consistently that surfactants used below their CMC significantly reduce gas mobility while allowing injection of fluids at desirable rates.

A useful surfactant can be chosen from a wide range of available chemicals, depending on the particular reservoir mineralogy, temperature, salinity of the available injection brine, cation exchange expected during the process, and injected gas. It is important that the surfactant molecule be structured and the brine formulated such that the surfactant remains below its CMC in the presence of reservoir fluids and minerals. The surfactant should also form only a weak foam such that oil is not significantly emulsified, and propagate rapidly through the reservoir. Preferably, at least about 80 percent of the surfactant should propagate within the first tenth of a pore volume of the surfactant/brine solution injected. Also, for WAG operations, the surfactant should reduce gas mobility after two or three WAG cycles to less than that of the waterflood.

A partial list of the available surfactants known to act as foaming agents in oil-bearing reservoirs and to have a CMC (in representative brines) high enough for application in this invention include: diarylether disulfonates, alpha olefin sulfonates and disulfonates, hydroxyalkane sulfonates, internal olefin sulfonates, alcohol ethoxycarboxylates, alkyl polyglycosides, alcohol ethoxylates, alcohol ethoxysulfates, alcohol ethoxyalkylsulfonates, alcohol ethoxyglycerylsulfonates, alkylphenyl ethoxycarboxylates, alkylphenyl ethoxylates, alkylphenyl ethoxysulfates, alkylphenyl ethoxyalkylsulfonates, and alkylphenyl ethoxyglycerylsulfonates.

Surfactants having the following chemical structure are particularly suitable for this process:

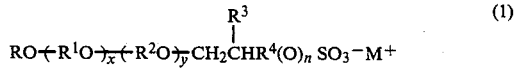 (1)

Wherein:
R = a 6 to 16 carbon linear or branched alkyl radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1

In a low temperature reservoir, or where the pH will not decline below 5, $R^3$ and $R^4$ may be hydrogen, and n may be 1. In carbonate reservoirs, anionic surfactants with a longer ethylene oxide chain (x+y=8-18), or nonionic surfactants with a high CMC (in a representative brine) may be used. In a low salinity reservoir, R may be an alkylphenyl radical wherein the alkyl group is a 6 to 12 carbon linear or branched alkyl radical or blend of alkyl radicals.

Some of these surfactants are already known for their use as foaming agents. U.S. Pat. No. 4,380,266 describes a carbon dioxide flooding process which employs an alcohol ethoxylate surfactant. U.S. Pat. No. 4,502,538 discloses an oil recovery process which uses liquefied or supercritical carbon dioxide and a polyalkoxy aliphatic sulfonate surfactant that would be similar to an alcohol ethoxyglycerylsulfonate or an alcohol ethoxyalkylsulfonate. U.S. Pat. No. 4,577,688 suggests the use of alcohol ethoxyalkylsulfonates as steam foaming agents.

The preferred surfactants for carbon dioxide displacements in high salinity, high temperature sandstone reservoirs have the following structure:

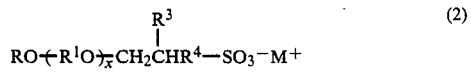 (2)

Wherein:
R = an 8 or 9 carbon radical such as 2-ethylhexyl
$R^1$ = ethyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 2-5

For operating convenience, it is desirable to use a surfactant with a CMC greater than about 250 to 500 parts per million (ppm) since such a concentration is accurately measurable and pumpable with typical injection equipment. The surfactant used in this process should be soluble at reservoir temperatures in a convenient injection brine and should remain substantially soluble in the presence of oil, the injected gas, and the multivalent ions which may be released during the recovery operation. The surfactant should also remain hydrolytically stable at the reservoir temperature and pH encountered during the process.

It has been found that simple shaking tests of a candidate surfactant diluted in reservoir brine and the reservoir crude oil, and CMC measurements of these surfactant solutions at reservoir temperature, are sufficient to screen promising surfactants. Lack of oil emulsification in shaking tests and a high CMC are requirements to be useful in this process. Surfactant propagation experiments and displacements of oil and water by injected gas in the presence of reservoir minerals, or minerals believed to be good analogs, are required to identify the optimum surfactant for a particular application.

The gas used in a gas flooding operation of the present invention can comprise substantially any gas which is substantially inert to and compatible with the surfactant and other components injected along with the gas. Such a gas is preferably carbon dioxide, but can comprise other gases, such as air, carbon monoxide, ethane, methane, flue gas, fuel gas, nitrogen, produced reservoir gases, steam, and the like, and mixtures thereof. Produced reservoir gases may be collected and reinjected with the original gas injected. As used herein, the term gas includes supercritical or liquid carbon dioxide, which may be used in this invention.

The dilute surfactant solutions are particularly useful in a WAG operation, where multiple injections of dilute surfactant solution are alternated with injections of a gas. The volumetric ratio of surfactant solution to gas (determined at reservoir conditions) is selected such that the phase velocities between the two are approximately the same within the reservoir. Typical ratios range from about 2:1 to about 1:5. It has been found that foam strength increases with successive WAG cycles.

In one possible mode of the present invention, a dilute surfactant solution, formulated to contain surfactant at less than its CMC, is injected into the reservoir. Alternatively, the dilute solution may be formulated to contain a mixture of two or more surfactants, present in the solution at a concentration that is less than the CMC characteristic of the mixture of surfactants. The injection of dilute surfactant solution is followed by injection of a gas to displace the surfactant solution within the reservoir. Injections of surfactant solution and gas may be repeated, and may be followed by injection of an aqueous solution of water or brine suitable for injection into the particular formation and appropriate for the surfactant to be used.

In another mode of operation, particularly applicable to reservoirs subject to gravity override, a conventional surfactant solution preslug, formulated to contain surfactant present at more than its CMC, is injected first. This preslug is followed by injection of a gas, then injection of a second, dilute surfactant solution formulated to contain surfactant at less than its CMC, and then by injection of more gas. Injections of dilute surfactant solution and gas may be repeated, and may be followed by injection of water or brine suitable for injection into the particular formation and compatible with the surfactant to be used.

In this mode, it may be desirable to use for the preslug a conventional surfactant with a hydrophobe containing an average of one or two more carbon atoms than those present in the hydrophobe (designated by the "R" group in the formulas above) of the surfactant injected at less than its CMC. These surfactants are known to form stronger foams. It is speculated that the larger surfactant molecules present at greater than their CMC will remain closer to the wellbore and provide near-wellbore mobility control, while the smaller surfactant molecules, present at less than their CMC, will begin to propagate through the reservoir more quickly. Subsequent injections of the dilute surfactant solution, formulated to contain surfactant at less than its CMC, will provide mobility control in the reservoir during the gas flooding operation.

The dilute surfactant solutions may also be used in a dissolved gas flooding operation, where injection of gas is followed by injection of a relatively large volume of water or brine which dissolves and transports the gas through the reservoir. Injection of a surfactant solution prior to injection of gas or brine provides mobility control. The gas used in such operations is carbon dioxide, which results in a carbonated water flooding operation, although other gases that will dissolve in water could be used. The volumetric ratio of surfactant solution plus brine to gas (determined at reservoir conditions) is typically from about 5:1 to about 20:1.

In one possible mode of dissolved gas flooding of the present invention, a dilute surfactant solution, formulated to contain surfactant at less than its CMC, is injected into the reservoir. Alternatively, the dilute solution may be formulated to contain a mixture of two or more surfactants, present in the solution at a concentration that is less than the CMC characteristic of the mixture of surfactants. The injection of dilute surfactant solution is followed by injection of carbon dioxide, and then by injection of an aqueous solution of water or brine, suitable for the formation and compatible with the surfactant used. The carbon dioxide gas dissolves in the water or brine, forms carbonated water, and is displaced within the reservoir by the brine.

In another mode of operation, particularly applicable to reservoirs subject to gravity override, a conventional surfactant solution preslug, formulated to contain surfactant present at more than its CMC, is used in combination with the dilute surfactant solution. In this mode, it may be desirable to use for the preslug a conventional surfactant with a hydrophobe containing an average of one or two more carbon atoms than those present in the hydrophobe (designated by the R group in the formulas above) of the surfactant injected at less than its CMC. The conventional surfactant solution preslug is injected first, followed by an injection of carbon dioxide, and then followed by an injection of the dilute surfactant solution, formulated to contain surfactant at less than its CMC, and more carbon dioxide. Water or brine is subsequently injected to form carbonated water and transport the carbon dioxide through the reservoir.

Having discussed the invention with reference to certain of its preferred embodiments, it is pointed out that the embodiments discussed are illustrative rather than limiting in nature, and that many variations and modifications are possible within the scope of the invention. Many such variations and modifications may be considered obvious and desirable to those skilled in the art based upon a review of the foregoing description of preferred embodiments and the following experimental results.

EXPERIMENTAL RESULTS

Experiments were conducted with several surfactants in various brines to measure (1) critical micelle concentration (CMC), (2) emulsion stability, (3) foam stability, (4) surfactant propagation and retention rates in representative cores, (5) gas injectivity/mobility control in representative sand packs, and (6) oil recovery in representative sand packs.

Experimental Procedures

Figure 1:
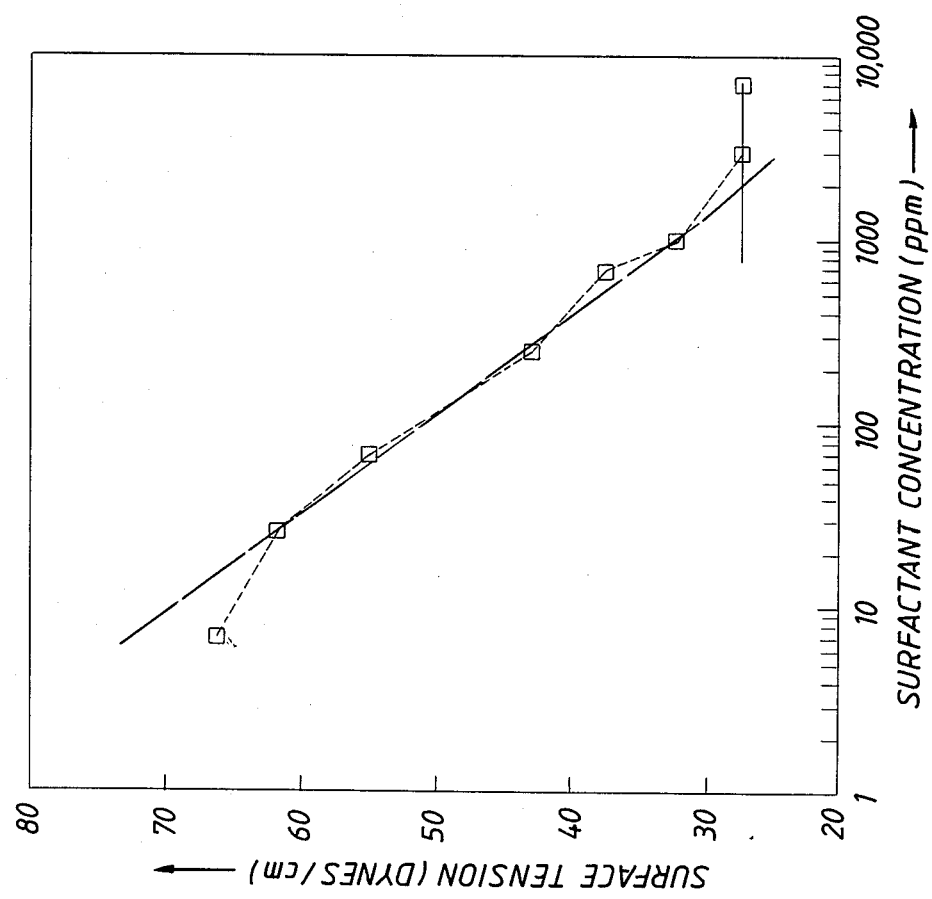
FIG. 1 shows the determination of critical micelle concentration (CMC) for a surfactant.

The surfactant CMC values were determined by measuring the surface tension of surfactant in solution for roughly ten different concentrations of surfactant. Surface tensions were determined by either the drop volume method or the bubble pressure method. The two methods gave similar results. The surface tension values were then plotted versus the surfactant concentration, resulting in a graph with two sections having distinct slopes, as shown in FIG. 1. Below the CMC, the surface tension declines rapidly with increased surfactant concentration. Above the CMC, increased concentration has little effect on surface tension. The CMC was taken as the intersection of the two best straight lines drawn through the two groups of data. (In FIG. 1, the CMC value can be determined as 2200 ppm.)

The CMC of the surfactant should be determined in the brine intended for use in the surfactant-enhanced gas flooding operation. The brine used to prepare surfactant solutions in these experiments was D sand water (DSW), a synthetic reservoir brine representative of Gulf Coast reservoirs, which contains about 120,000 parts per million (ppm) salinity. The DSW was used at several different strengths, and for some experiments concentrated (104% and 150%) solutions of DSW were used as the test brine. Measurements were taken at 170° F.

In the emulsion stability experiments, test tubes were filled with 14 $cm^3$ of surfactant solution and 14 $cm^3$ of oil. The test tubes were equilibrated with gentle agitation at reservoir temperatures (about 170° F.) for twenty-four hours, then shaken vigorously for 15 seconds. The emulsion layer formed was measured, and the time (in seconds) required for the emulsion layer to decrease to half its original size (the emulsion half-life) was determined.

The foam strength experiments were conducted in a manner similar to the emulsion stability experiments. Test tubes were filled with 14 $cm^3$ of surfactant solution and 2 $cm^3$ of oil. The test tubes were equilibrated with gentle agitation at reservoir temperatures (about 170° F.) for twenty-four hours, then shaken vigorously for 15 seconds. The foam layer formed was measured and the time (in seconds) required for the foam layer to decrease to half its original size (the foam half-life) was determined.

The surfactant propagation and retention experiments were conducted in Berea cores mounted in a Hassler core holder. The cores were flushed with several pore volumes of brine to remove soluble iron and other contaminants. Oil was then injected, followed by water to reduce the oil saturation to a residual level. Surfactant was then injected and the concentration of surfactant in the effluent from the core was measured versus the number of pore volumes produced from the core. Surfactant concentrations were normalized by dividing the actual effluent concentration (C) by the injected concentration ($C_o$), to facilitate comparison of different surfactants. Production of about 0.6 pore volume was required to displace the brine initially present in the core.

Gas injectivity/mobility control and oil recovery experiments were conducted in stainless steel tubes packed with Ottawa sand. The tubes were at least five feet long to reduce the influence of capillary end effects on production characteristics. The pressure drop across the tubes was calculated from pressures measured at taps welded onto the tube at least one foot from either end. The pressure drop was not measured across the entrance or exit of the tube, since capillary end effects and skins would make the measurement inaccurate.

The sand packs were first flushed with brine, when flooded with oil to a high oil saturation, and then flooded with water to reduce the oil to a residual oil saturation. A surfactant preslug was sometimes injected to saturate the sand pack with surfactant before the gas was injected. The pore volume of the preslug varied between 0.3 and an amount sufficient to completely satisfy all surfactant adsorption requirements. Carbon dioxide was co-injected with the surfactant/brine solution at ratios selected to simulate a WAG flooding operation. Injectivity was calculated as the ratio of fluid (gas/foam) mobility during a WAG operation to water flood mobility. An injectivity of less than one indicates that gas mobility has been lowered to less than that of the water.

In a test designed to test the durability of the foam formed, carbon dioxide and surfactant solution were alternately injected in multiple pore volume slugs to simulate long WAG cycles. In an actual WAG operation, gas may be injected continuously for as long as two to four weeks. This can cause the foam present to dry out. This "foam drainage test," conducted over 9 days, was designed to determine the longevity of the foam at low water saturation. Foam was developed at an injected fluids rate of about 18 feet/day (relatively severe conditions) then lowered to about 6 feet/day for the foam drainage test.

Surfactant Structure and CMC Measurements

Table 1 shows several of the surfactants evaluated and their CMC values in various types of solutions. Examples of two types of surfactants are listed: (1) alcohol ethoxyglycerylsulfonates (AEGS) and (2) alcohol ethoxyethylsulfonates (AEES). The surfactant designations also disclose their molecular structure (as described in Table 1). The surfactants with shorter hydrophobes (the preferentially water insoluble end of the surfactant molecule) have larger CMC values. Particularly preferred are surfactants with hydrophobes that have a branch in the hydrophobe chain. Lower solution salinities for a given surfactant also provide greater CMC values for a given surfactant. Since a surfactant should be selected to be compatible with an available brine, for higher salinity brines, a surfactant with a shorter hydrophobe would be used, and for a lower salinity brine, a surfactant with a longer hydrophobe could be used.

TABLE 1

SURFACTANT STRUCTURE AND CMC VALUES

| Surfactant[1] | CMC Values[2] (ppm) | | | | |
|---|---|---|---|---|---|
| | 30% DSW | 70% DSW | 100% DSW | 104% DSW | 150% DSW |
| AEGS 1215-12 | 20 | 5 | — | — | — |
| AEGS 911-2.5 | 300 | 130 | — | — | 60 |
| AEES 810-3 | — | 300 | — | — | — |
| AEES 610-3 | — | 460 | 350 | — | — |
| AEGS 9-2.6 | 2100 | 800 | — | — | 200 |
| AEES 2, 6-3 | — | — | — | 1350 | — |

TABLE 1-continued

| SURFACTANT STRUCTURE AND CMC VALUES | | | | | |
|---|---|---|---|---|---|
| | CMC Values[2] (ppm) | | | | |
| Surfactant[1] | 30% DSW | 70% DSW | 100% DSW | 104% DSW | 150% DSW |
| AEGS 2, 6–4.5 | 2700 | 2200 | 1380 | 1397 | 800 |

Notes:
[1]Surfactants are designated by type, number of carbon atoms in the hydrophobe, and average number of ethylene (or propylene) oxide units. For example, AEGS 1215-12 is an alcohol ethoxyglycerylsulfonate (AEGS) with a mixture of 12 to 15 carbon atoms in the hydrophobe and an average of 12 ethylene oxide groups, and AEES 2,6-3 is an alcohol ethoxyethylsulfonate (AEES) that has a hydrophobe with a 2 carbon atom branch on a 6 carbon main chain.
[2]CMC values were determined in 30%, 70%, 100%, 104% and 150% synthetic reservoir D sand water (DSW). DSW at 100% contains about 120,000 ppm salinity.

Emulsion Stability Measurements

Table 2 shows emulsion stability for two of the most preferred surfactants listed in Table 1 at various concentrations relative to CMC, determined in 70% DSW. As surfactant concentrations increase, the emulsion stability of each surfactant increases at about the same rate, until a concentration of about 60% of the CMC is reached. At this point, emulsion stability time increases rapidly as concentrations increase. The emulsion stability of the branched hydrophobe surfactant, AEGS 2, 6—4.5, while higher at any fraction of CMC, is lower at any absolute concentration. This reflects the fact that for a given surfactant concentration, the branched hydrophobe surfactant is present at a lower fraction of its CMC value and provides a weaker emulsion.

It may be concluded from these results, that to avoid stable emulsions, one must stay below the CMC value for the surfactant used. An emulsion half-life time of 40 seconds or less indicates only a weak emulsion, and would indicate a surfactant useful in the present invention.

TABLE 2

| EMULSION STABILITY VS. CONCENTRATION FOR TWO SURFACTANTS[1] | | | | |
|---|---|---|---|---|
| | AEGS 9–2.6 | | AEGS 2, 6–4.5 | |
| Surfactant Concentration (ppm) | Concentration ÷CMC | Emulsion Half-life(Sec) | Concentration ÷CMC | Emulsion Half-life(Sec) |
| 100 | 0.13 | 18 | — | — |
| 250 | 0.31 | 25 | — | — |
| 500 | 0.63 | 38 | 0.23 | 20 |
| 750 | 0.94 | 240 | 0.34 | 20 |
| 1000 | 1.25 | 290 | 0.45 | 25 |
| 1250 | 1.56 | — | 0.57 | 35 |
| 1500 | 1.87 | 510 | 0.68 | 75 |
| 2500 | 3.13 | 270 | 1.13 | 465 |
| 5000 | 6.25 | 325 | — | — |

Note:
[1]All CMC and emulsion stability values determined in 70% DSW. CMC value for AEGS 2, 6–4.5 was 2200 ppm, and for AEGS 9–2.6, 800 ppm.

Foam Stability Experiments

The effect of hydrophobe length on foam stability of several surfactants in 70% DSW in the absence of oil is shown in FIG. 2. The concentration values have been expressed as a ratio in terms of the CMC value for each surfactant. The foam half-life decreases dramatically below the CMC for each surfactant. At surfactant concentrations of 500 ppm, the foam half-lives of AEGS 911—2.5, AEGS 9—2.6, and AEGS 2, 6—4.5 are 4500, 150, and 30 seconds, respectively. Thus, at a given concentration, foam stabilities are lower for surfactants with higher CMC values.

Foam half-life data is reported in Table 3 for several surfactants used in this study. For each surfactant, measurements were made at the same concentration and salinity used in each of the mobility, oil recovery, or surfactant propagation experiments. Since the data is reported for surfactants at either 500 or 1000 ppm in brines of three salinities, it is difficult to identify trends. However, in general, foam half-life decreases as the concentration is reduced below the CMC. A foam half-life of 100–200 seconds is generally adequate for a surfactant-enhanced gas flooding operation.

TABLE 3

| FOAM STABILITY EXPERIMENTS | | | | |
|---|---|---|---|---|
| | | Concentration[1] ÷CMC | Foam Half-Life (Sec) | |
| Surfactant | Solvent % DSW | | Without Oil | With Oil |
| AEGS 911–2.5 | 70 | 3.85 | 4500 | 300 |
| AEES 810–3 | 70 | 1.67 | 300 | 45 |
| AEES 610–3 | 100 | 1.43 | 7200 | 60 |
| AEGS 9–2.6 | 70 | 0.63 | 150 | 50 |
| AEES 2, 6–3 | 104 | 0.74 | 120 | 10 |
| AEGS 2, 6–4.5 | 70 | 0.23 | 30 | 10 |

Notes:
[1]CMC values were determined in the same D sand water (DSW) as the foam stability experiments.

Surfactant Propagation and Retention Experiments

Figure 3:
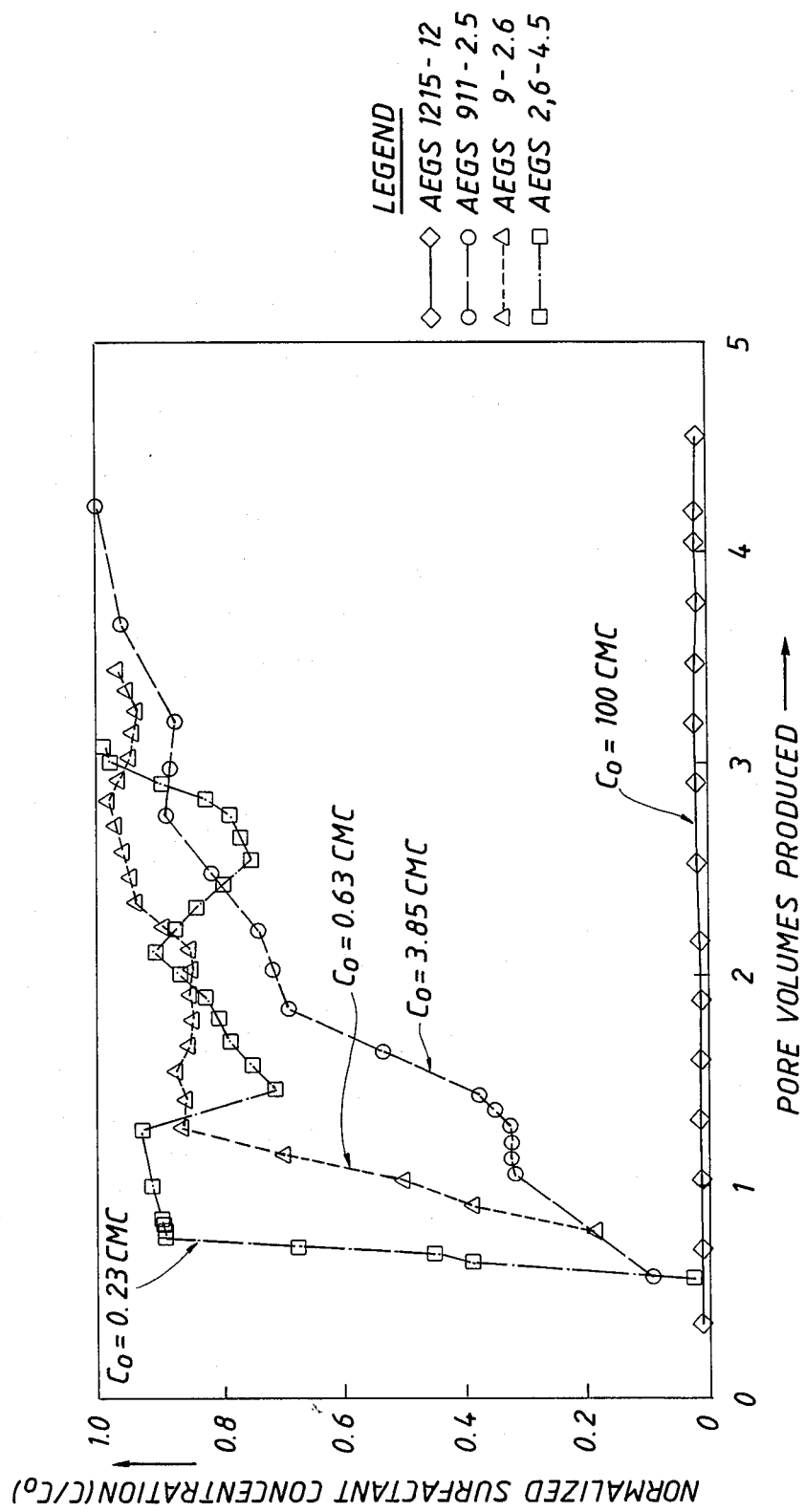
FIG. 3 shows propagation and retention of surfactants used at concentrations above and below their CMC values.

Surfactant propagation and retention experiments are illustrated in FIG. 3. A rapid breakthrough of surfactant through the core indicates low retention and a high propagation rate for the surfactant, both desirable properties to achieve mobility control. Results are shown for four surfactants, all of which are listed in Table 1. The surfactants were all injected at a concentration of about 500 ppm, consequently, the surfactants were injected at 100, 3.85, 0.63, and 0.23 times their CMC values. The concentration of surfactant exiting from the core (C) divided by its inlet concentration ($C_o$), the normalized surfactant concentration ($C/C_o$), is plotted versus the number of pore volumes of fluid produced from the core. The initial production of about 0.6 pore volume displaced the brine initially present in the core.

The results shown in FIG. 3 may be summarized as follows. Less than 2 percent of the surfactant with the lowest CMC value (AEGS 1215—12), injected at a concentration of 100 times its CMC value ($C_o=100$ CMC), was produced from the core, even after over four pore volumes of fluid were produced (about 3.4 pore volumes after the brine initially present was displaced) from the core. For the surfactants injected at concentrations less than their CMC values, AEGS 9—2.6 ($C_o=0.63$ CMC) and AEGS 2, 6—4.5 ($C_o=0.23$ CMC), 85 to 95 percent of the injected concentration was produced after only about 1.2 and 0.7 pore volumes of fluid were produced from the core. The results for AEGS 911—2.5 approached those of the high CMC surfactants, but only 30 percent of the injected concentration was produced with the first 1.2 pore volumes of fluid produced, and production of over four pore volumes of fluid was required to reach $C/C_o=1$.

From these results, it may be concluded that when a surfactant's concentration is below its CMC, most of the surfactant will propagate through the reservoir, and consequently, a lower total quantity of surfactant will be required to obtain a given recovery. Since the surfactants with higher CMC values also generally have shorter hydrophobes, this is consistent with the general principal that adsorption decreases as hydrophobe length decreases.

Gas Injectivity/Mobility Control Experiments

Figure 4:
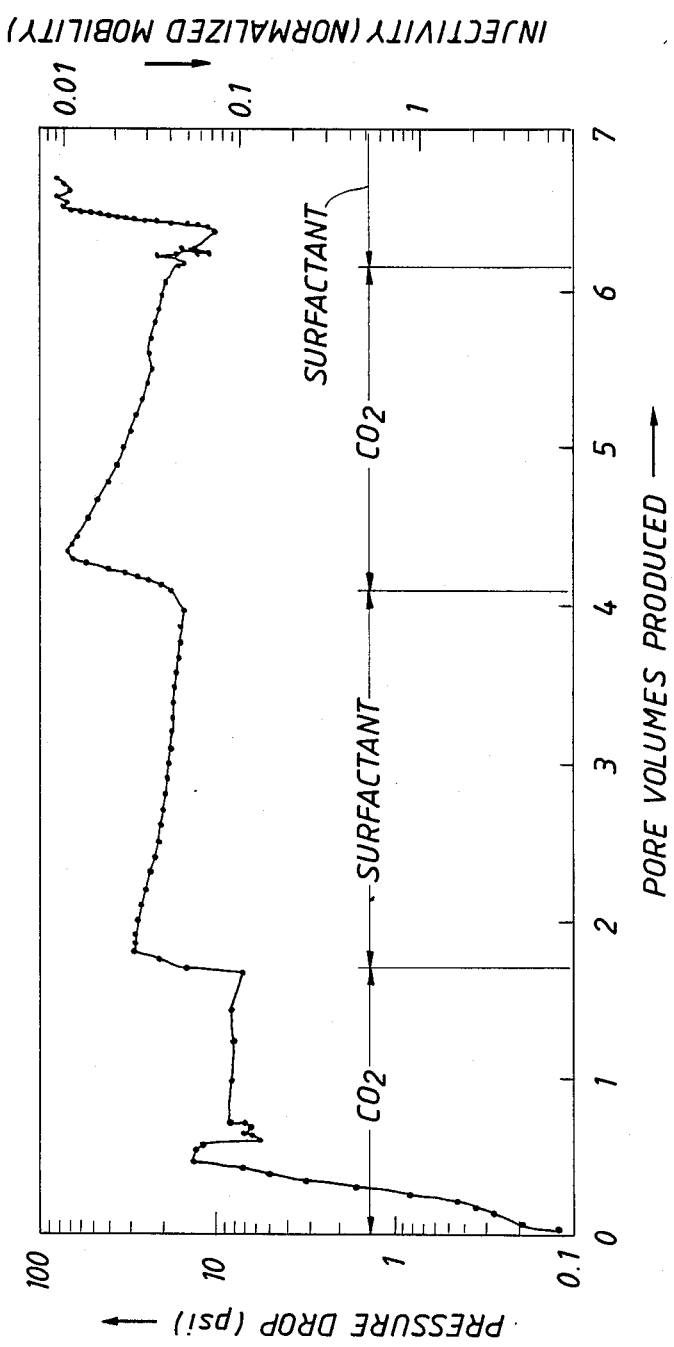
FIGS. 4 and 5 depict sand pack injection pressure drops for surfactants used at concentrations above and below their CMC values in a WAG operation.
Figure 5:
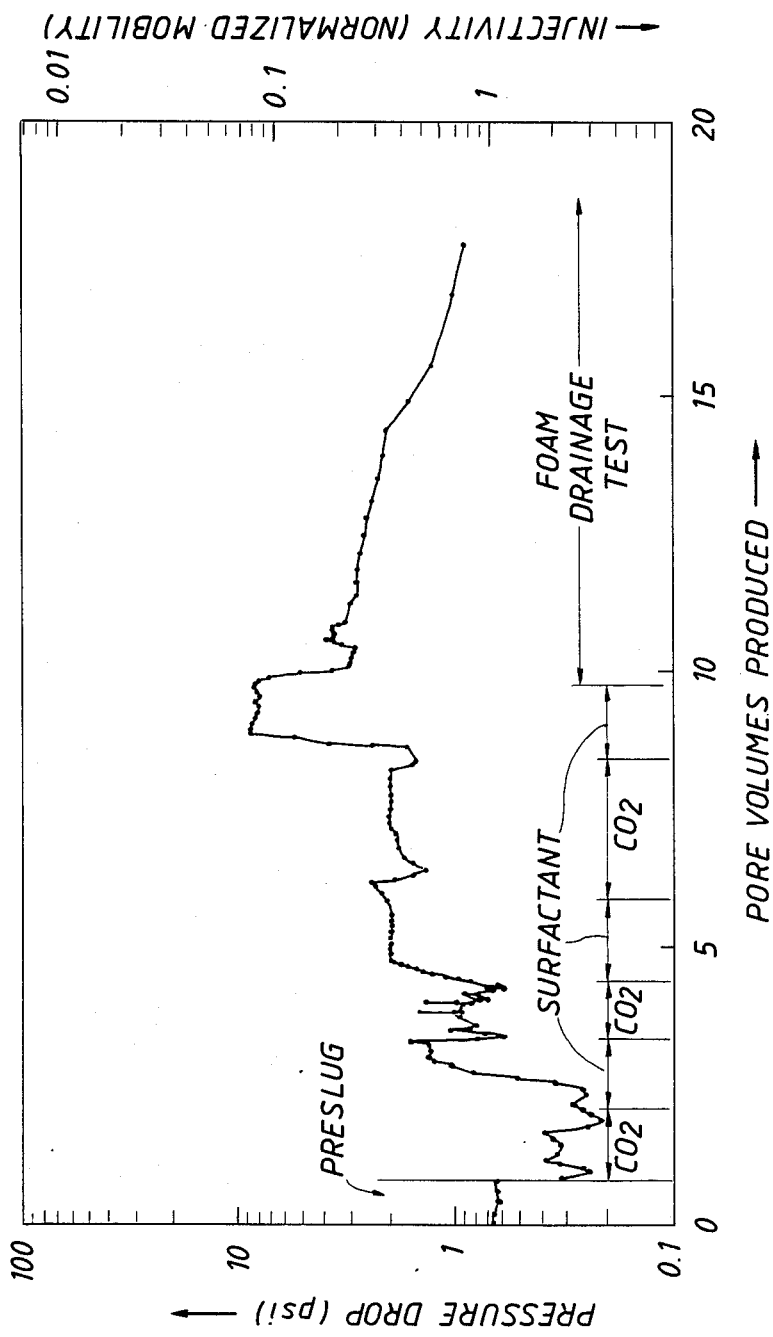

Gas injectivity/mobility control experiments are illustrated in FIGS. 4 and 5. Two of the surfactants listed in Table 3, AEES 610—3 and AEES 2, 6—3, were used at 500 ppm (100% DSW) and 1000 ppm (104% DSW), respectively, in gas injectivity/mobility control experiments.

As can be seen in FIG. 4, successive injections of a surfactant present at more than its CMC, such as AEES 610—3 at 500 ppm, rapidly increased the pressure drop across the three foot test section to over 80 psi, providing a pressure drop of 27 psi/ft. Surfactant solution mobility was less than one percent of the waterflood mobility at the end of the third cycle. Carbon dioxide mobility was three percent of the waterflood mobility at the end of the last carbon dioxide cycle. At the end of this experiment, carbon dioxide mobility had been reduced by a factor of 1400 at a brine saturation of less than two percent. Although these mobility reductions appear desirable, the pressure drop reported above (27 psi/ft) could not be maintained in a typical field operation without substantially reducing the injection rate of carbon dioxide, surfactant solution, or both.

In another experiment, reported in FIG. 5, AEGS 2, 6—3 was injected at about 74 percent of its CMC. AEES 2, 6—3 is a weak foamer with a half-life of 120 L seconds (Table 3). The foam was formed in three WAG cycles, but the pressure drop across the three foot test section was only 9 psi (3 psi/ft). This is an acceptable pressure drop. $CO_2$ mobility was 33% of the waterflood mobility at the end of the third $CO_2$ cycle. Surfactant solution mobility was 8% of the waterflood mobility at the end of the third surfactant cycle.

In order to be useful, a foam must not only form quickly while causing only modest pressure drops but the foam must be durable enough to reduce gas mobility for long gas injection cycles, since the gas injection cycle in a reservoir project can be as short as one week or longer than a month. Durability of the foam was tested in the fourth carbon dioxide cycle (designated as "Foam Drainage Test" on FIG. 5). Carbon dioxide injection was continued for nine days in that cycle. Mobility of the gas gradually increased, however, the mobility was still less than 70 percent of the waterflood at the end of the cycle. Carbon dioxide mobility was reduced by a factor of 43, still an acceptable value, even at a low water saturation of 4.5 percent. Earlier in the last cycle, carbon dioxide mobility had been reduced by a factor of 100.

It can be concluded from these two experiments that foams formed in WAG cycles from surfactants used below their CMC are durable enough to survive fairly rigorous conditions, while foams formed in WAG cycles using surfactants above their CMC values can be so strong as to prevent continued injection of fluids into a reservoir at the same flow rate. It can also be concluded that a surfactant with a foam half-life as low as 100 to 200 seconds is sufficient to reduce carbon dioxide mobility.

Oil Recovery Experiments

Figure 6:
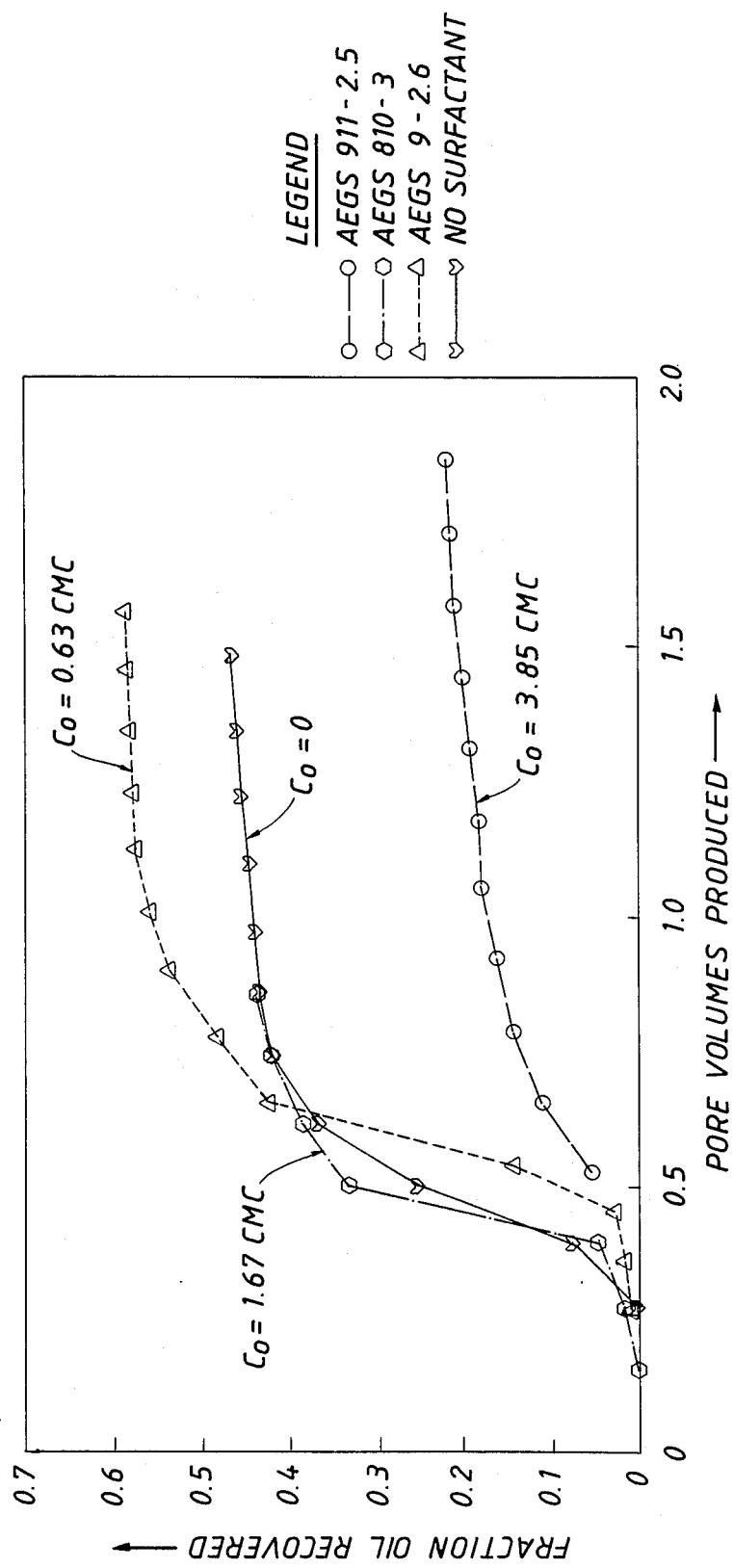
FIGS. 6 and 7 illustrate the effect of including surfactants at concentrations above and below their CMC values on oil recovery in a WAG operation.
Figure 7:
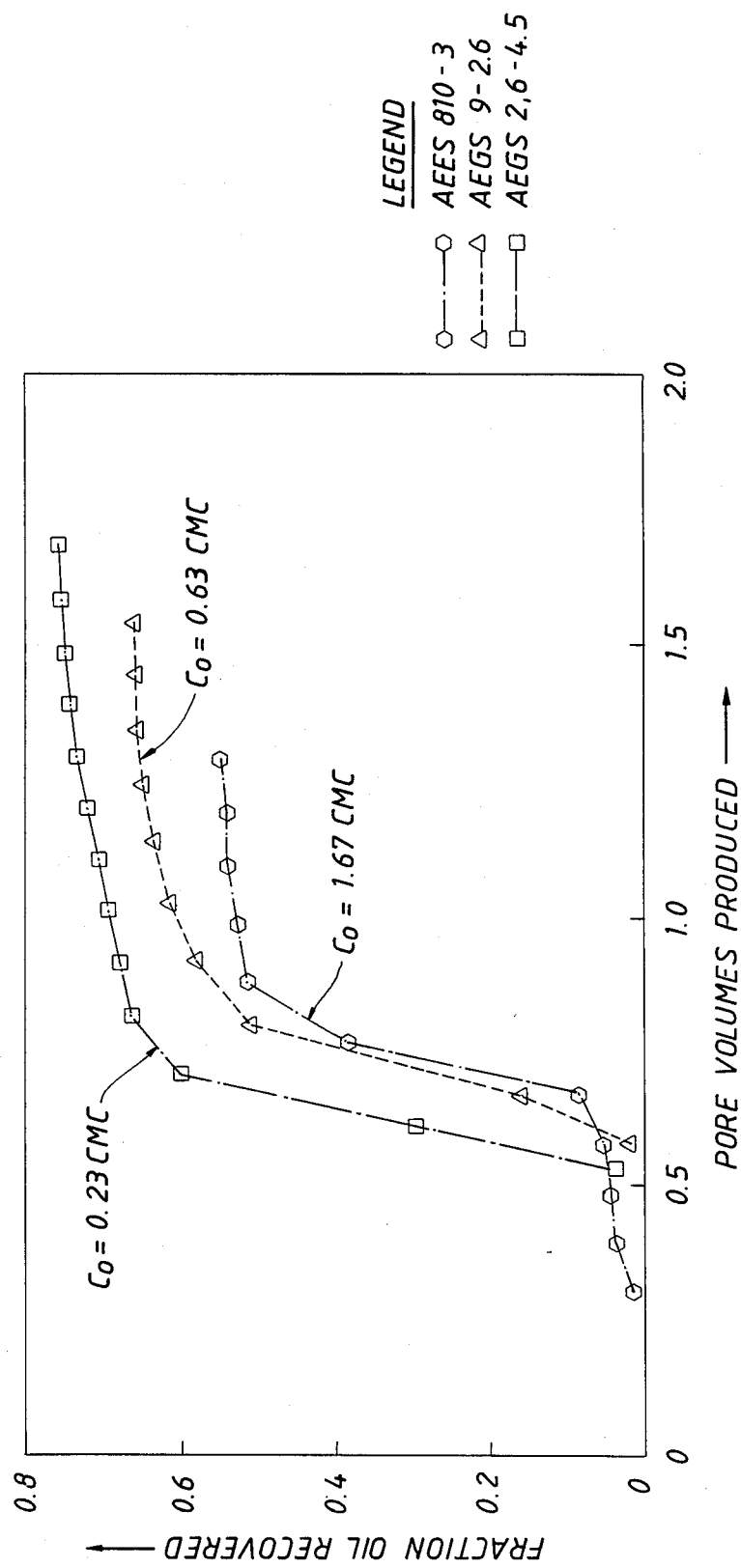

Oil recovery experiments are illustrated in FIGS. 6 and 7. Results are shown for two different types of operations: FIG. 6 shows results for coinjection of one pore volume of water/brine for every three volumes of carbon dioxide and FIG. 7 shows results for coinjection of equal volumes of water/brine and carbon dioxide. The surfactants used are all listed in Table 1. The oil recovery values shown are based on the residual oil contained in the sand packs at the beginning of the experiments.

The results shown in FIG. 6 may be summarized as follows. The surfactant injected at 0.63 times its CMC (AEGS 9—2.6) achieved the best oil recovery, about 56% ROS after production of about 1.0 pore volume, while the surfactant injected at 3.85 times its CMC (AEGS 911—2.5) demonstrated an oil recovery of only about 17% ROS after production of about 1.0 pore volume. The surfactant injected at 3.85 times its CMC (AEGS 911—2.5) produced even less oil than a WAG operation with no injected surfactant. The surfactant injected at 1.67 times its CMC (AEES 810—3), produced about the same amount of oil as no surfactant. The sand packs for the experiments shown in FIG. 6 were presaturated with surfactant.

The results shown in FIG. 7 may be summarized as follows. The surfactant injected at only 0.23 times its CMC (AEGS 2, 6—4.5) achieved the best oil recovery, about 69% ROS after production of about 1.0 pore volumes. The performance of the other surfactants, though not as good, was also acceptable. The surfactant injected at 0.63 times its CMC (AEGS 9—2.6) provided about 60% ROS after production of one pore volume, while the surfactant injected at 1.67 times its CMC (AEES 810—3) provided about 53% ROS. No surfactant preslug was used in the sand packs for the experiments shown in FIG. 7.

The differences in oil recoveries shown between FIGS. 6 and 7 illustrate the improved oil recovery that can be achieved simply by using a surfactant, such as AEGS 9—2.6 or AEGS 2, 6—4.5, at a concentration below its CMC. When a surfactant, such as AEES 810—3 or AEGS 911—2.5 is used above its CMC with a preslug, oil recovery is the same or lower than if no surfactant is used. When a surfactant is used below its CMC, with or without a preslug, the oil is produced faster than if a surfactant is used above its CMC. Reduced fluid mobilities found when surfactant is used above its CMC have two effects. First, the in-situ gas saturation is higher, thereby reducing the rate of fluid movement in the core. Second, if mobilities are reduced too much, it can take too long to inject fluids into a reservoir.

Oil recovery is lower when a surfactant is used above its CMC because oil is emulsified by the surfactant. The emulsion half-life values of AEGS 9—2.6 and AEGS 2, 6—4.5, used at 500 ppm (below their CMC), where oil recovery is high, are listed in Table 2 as 38 and 20 seconds, respectively. Surfactants that demonstrated low emulsion stability (less than 40 seconds in Table 2) showed better oil recoveries in these tests. Thus, it can be concluded that oil recovery increases as emulsion stability decreases.

COMPARATIVE EXAMPLES

The practical benefit of using surfactant below its CMC can be illustrated by calculating sweep efficiency for a WAG flooding operation without surfactant and with a surfactant used below and above its CMC. The examples are presented for a reservoir where gravity override is so severe that gas probably would not be injected into the reservoir unless foam is used to reduce gas mobility. Fluid mobilities determined from the gas injection/mobility control experiments illustrated in FIGS. 4 and 5 were used in these calculations.

The calculations consist of calculating a viscous gravity ratio ($N_{vgr}$), which is the dimensionless fraction of the reservoir length in which fluids flow together before they segregate. The viscous gravity ratio may be determined from the relationship:

$$N_{vgr} = \frac{Q_t}{d\rho \, g \, K_v \, A(\lambda_w + \lambda_g)}.$$

Figure 8:
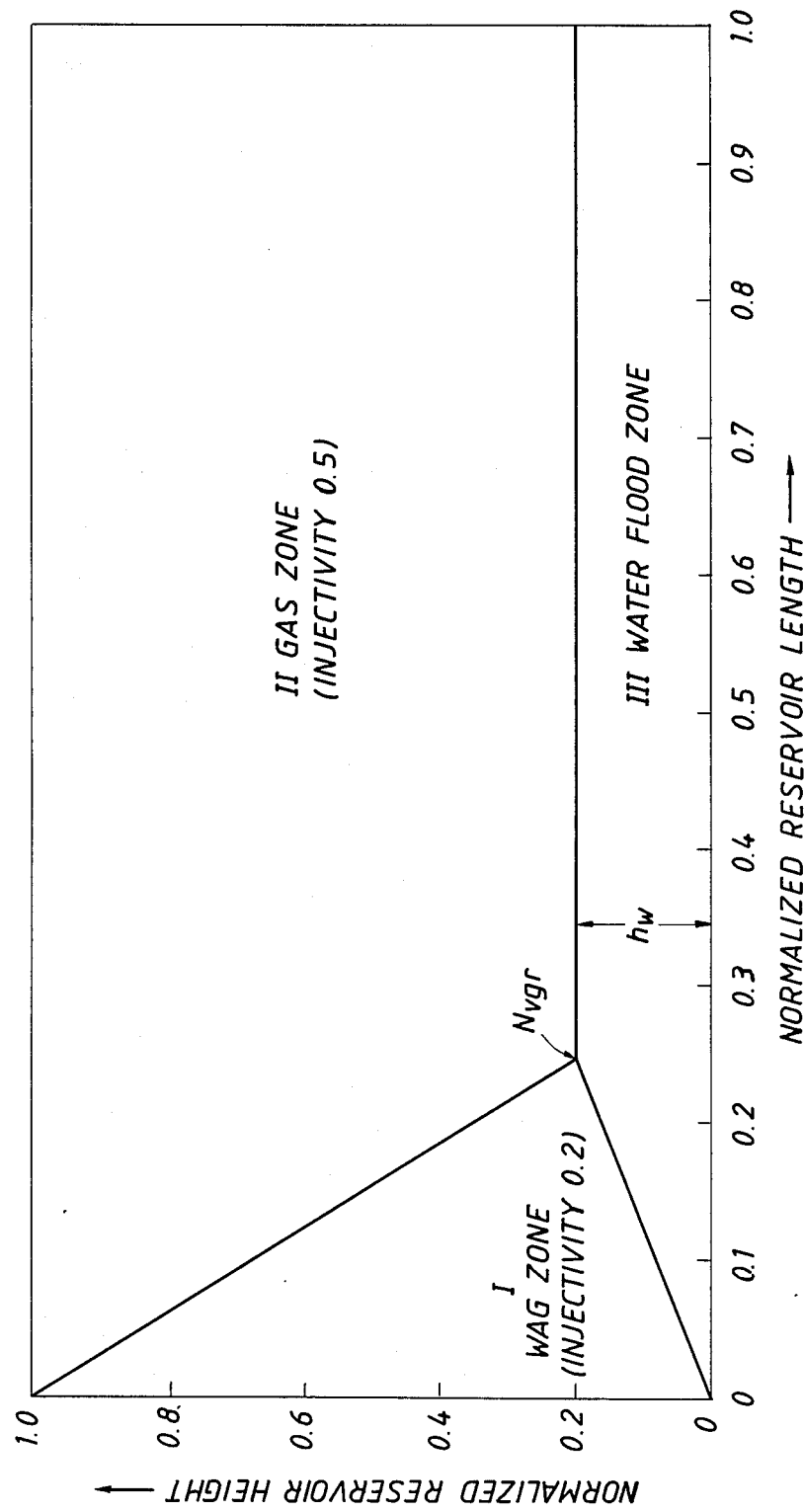
FIG. 8 depicts the segregation obtained in a WAG operation with surfactant present at a concentration less than its CMC.

This relationship results from the assumption that the rate water flows down in a WAG zone is equal to the rate gas flows up. The fraction of the reservoir's height which is occupied by brine ($h_w$), after segregation, is determined using the WAG ratio by the relationship:

$$h_w = \frac{1}{1 + \frac{\lambda_w/\lambda_g}{Q_w/Q_g}}$$

where:
$Q_t$ = total (water and gas) flow rate
$Q_w$ = water flow rate
$Q_g$ = gas flow rate
$d\rho$ = density difference
$g$ = acceleration due to gravity
$K_v$ = vertical permeability
$A$ = horizontal area of the reservoir
$\lambda_w$ = relative water mobility
$\lambda_g$ = relative gas mobility Through this calculation, a reservoir, illustrated in FIG. 8, is divided into three areas: a WAG zone where water and gas flow together (I), a gas zone where the injected gas flows after segregation (II), and a zone below the gas zone where the segregated water flows (III). The fraction of the reservoir that is swept by gas is the portion in zones I and II.

Calculations in these examples are based upon a 20 foot high sandstone reservoir with 1000 foot spacing between injector and producer wells, porosity of 30%, and a pore volume of 1.068 million barrels. Horizontal and vertical permeability are 500 and 100 millidarcy (md) respectively. Waterflood mobility is 0.16 darcy/centipoise (D/cp) and the density difference between water and gas is 0.5 g/cc. All calculations are based upon a WAG operation with a 1:2 water/gas ratio. The three sets of conditions used in this example are listed in Table 4 along with the results of the calculations. The pressure drop reported in Table 4 is obtained by integrating the pressure term in Darcy's law in radial coordinates through a 500 foot radius of an injection well with a skin of 15. The pressure drop was limited to a maximum of 800 psi. Integrating the equation in radial coordinates emphasizes the effect of the large pressure drops that occur near wells.

The results in Table 4 are explained as follows. Fluids can be easily injected in a WAG operation in the absence of surfactant with a pressure drop of less than 100 psig, however, only 26.4 percent of the reservoir is swept. Sweep is low because gas mobility, after water and gas have segregated, is very high. The result is that the gas does not contact oil in the bottom 83 percent of the reservoir, i.e., the height of zone III is 83% of the reservoir's height. The portion of the reservoir swept by gas cannot be increased significantly because the injection rate ($Q_t$) cannot be raised enough to increase $N_{vgr}$ to a significant fraction of the reservoir. Override is so rapid in this example that very little of the reservoir will be swept after the first year of injection.

When a strong foam resulting from a surfactant above the CMC is formed, like that resulting from AEES 610—3 depicted in FIG. 4, ultimate sweep improves to 97 percent. However, the mobility reduction from this foam is so large that fluids can only be injected at 2 bbl/ft/day compared to 30 bbl/ft/day in the absence of surfactant. The estimated time for injection of one pore volume of fluids will increase from less than 5 to more than 73 years. Thus, while ultimate sweep improves when a surfactant is used above the CMC and a tenacious foam forms, injectivity is lowered so much that production of oil is delayed drastically. The delay in production, lower oil recovery in the swept zone, and high surfactant adsorption, all make use of surfactant above the CMC very unattractive.

When a surfactant is used below its CMC, such as a surfactant having the properties of AEES 2, 6—3 and the mobilities reported in FIG. 5, the sweep depicted in FIG. 8 and the third column of Table 4 results. In this example, fluids can be injected at the same rate as without surfactant and with a pressure drop about the same as that when the surfactant is used above its CMC. Ultimate sweep is a bit lower (87 percent vs. 97 percent), but this sweep is achieved in only five years. This excellent project life is in addition to the greater oil recovery in the swept zone that is expected where surfactants are used below their CMC. Thus, use of surfactant below the CMC to improve a WAG is very attractive.

TABLE 4

| SWEEP, INJECTIVITY AND PRESSURE MANAGEMENT IN A GRAVITY DOMINATED RESERVOIR | | | |
|---|---|---|---|
| | WAG No Surfactant | WAG Surfactant >CMC | WAG Surfactant <CMC |
| WAG Injectivity $(\lambda/\lambda_{wf})^1$ | 1.6 | .01 | .2 |
| Dry Gas Injectivity $(\lambda/\lambda_{wf})^1$ | 10 | .1 | .5 |
| Injection rate (bbl/ft/day) | 30 | 2 | 30 |

TABLE 4-continued
SWEEP, INJECTIVITY AND PRESSURE MANAGEMENT IN A GRAVITY DOMINATED RESERVOIR

|  | WAG No Surfactant | WAG Surfactant >CMC | WAG Surfactant <CMC |
|---|---|---|---|
| Fraction of Reservoir Length ($N_{vgr}$) | .031 | .328 | .246 |
| Fraction of Reservoir Height ($h_w$) | .833 | .048 | .2 |
| Pressure Drop (psi) | 98 | 796 | 800 |
| Years to Inject 1 PV | 4.88 | 73.2 | 4.88 |
| Ultimate Sweep (%) | 26.4 | 97 | 87 |
| Sweep after 1 year | 20.5 | 1.3 | 20.5 |
| Sweep after 5 years | 26.4 | 5.3 | 87 |

Notes:
[1] $\lambda$ = all fluid mobility ($\lambda_w + \lambda_g + \lambda_o$, where $\lambda_o$ = oil mobility)
$\lambda_{wf}$ = waterflood mobility (mobility of water in a water flooding operation)

What is claimed is:

1. A process for recovering oil from a reservoir, penetrated by at least one injection well and one production well, comprising:
   (a) formulating an aqueous surfactant solution such that the surfactant is present in the solution at a concentration less than its critical micelle concentration;
   (b) injecting the surfactant solution into the reservoir; and
   (c) injecting a gas to displace the surfactant solution through the reservoir to assist in the recovery of hydrocarbons at the production well.

2. The process of claim 1 wherein the surfactant is selected from the group consisting of:

$$RO(R^1O)_x(R^2O)_y\overset{R^3}{\underset{|}{CH_2CHR^4}}(O)_nSO_3^-M^+$$

Wherein:
R = a 6 to 16 carbon linear or branched alkyl radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1.

3. The process of claim 1 wherein steps (b) and (c) are repeated at least once.

4. The process of claim 3 wherein the volumetric ratio of surfactant solution to gas is from about 2:1 to about 1:5.

5. The process of claim 1 wherein the reservoir is a sandstone reservoir and the surfactant is selected from the group consisting of:

$$RO(R^1O)_x\overset{R^3}{\underset{|}{CH_2CHR^4}}-SO_3^-M^+$$

Wherein:
R = an 8 or 9 carbon radical such as 2-ethylhexyl
$R^1$ = ethyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 2-5.

6. The process of claim 1 wherein step (c) is followed by displacing the gas with a brine solution.

7. A process for recovering oil from a reservoir, penetrated by at least one injection well and one production well, comprising:
   (a) formulating an aqueous surfactant solution such that the surfactant is present in the solution at a concentration less than its critical micelle concentration, and wherein the surfactant is selected from the group consisting of:

$$RO(R^1O)_x(R^2O)_y\overset{R^3}{\underset{|}{CH_2CHR^4}}(O)_nSO_3^-M^+$$

Wherein:
R = a 6 to 16 carbon linear or branched alkyl radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1
   (b) injecting the surfactant solution into the reservoir;
   (c) injecting carbon dioxide gas to displace the surfactant solution through the reservoir, wherein the volumetric ratio of surfactant solution to gas is from about 2:1 to about 1:5;
   (d) repeating steps (b) and (c) at least once; and
   (e) injecting a brine solution to displace the gas and surfactant solution within the reservoir, to assist in the recovery of hydrocarbons at the production well.

8. The process of claim 7 wherein the reservoir is a sandstone reservoir and the surfactant is selected from the group consisting of:

$$RO(R^1O)_x\overset{R^3}{\underset{|}{CH_2CHR^4}}-SO_3^-M^+$$

Wherein:
R = an 8 or 9 carbon radical such as 2-ethylhexyl
$R^1$ = ethyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 2-5.

9. A process for recovering oil from a reservoir, penetrated by at least one injection well and one production well, comprising:
   (a) formulating a solution containing a mixture of at least two surfactants, wherein the mixture of surfactants is present in the solution at a concentration that is less than the critical micelle concentration characteristic of the mixture;
   (b) injecting the surfactant mixture solution into the reservoir; and
   (c) injecting a gas to displace the surfactant mixture solution through the reservoir to assist in the recovery of hydrocarbons at the production well.

10. The process of claim 9 wherein at least one of the surfactants is selected from the group consisting of:

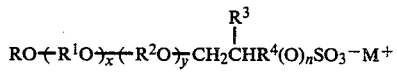

Wherein:
- R = a 6 to 16 carbon linear or branched alkyl radical or blend of alkyl radicals
- $R^1$ = ethyl or i-propyl group
- $R^2$ = ethyl or i-propyl group
- $R^3$ = OH when $R^4$ = $CH_2$, or H when $R^4$ is absent
- $R^4$ = $CH_2$ when $R^3$ = OH, or absent when $R^3$ = H
- M = sodium, potassium, or ammonium
- x = 0–9
- y = 0–9
- n = 0–1.

11. The process of claim 9 wherein steps (b) and (c) are repeated at least once.

12. The process of claim 11 wherein the volumetric ratio of surfactant mixture solution to gas is from about 2:1 to about 1:5.

13. The process of claim 9 wherein the reservoir is a sandstone reservoir and at least one of the surfactants is selected from the group consisting of:

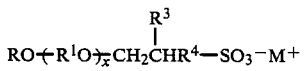

Wherein:
- R = an 8 or 9 carbon radical such as 2-ethylhexyl
- $R^1$ = ethyl group
- $R^3$ = OH when $R^4$ = $CH_2$, or H when $R^4$ is absent
- $R^4$ = $CH_2$ when $R^3$ = OH, or absent when $R^3$ = H
- M = sodium, potassium, or ammonium
- x = 2–5.

14. The process of claim 9 wherein step (c) is followed by displacing the gas with a brine solution.

15. A process for recovering oil from a reservoir, penetrated by at least one injection well and one production well, comprising:
(a) formulating a solution containing a mixture of at least two surfactants, wherein the mixture of surfactants is present in the solution at a concentration that is less than the critical micelle concentration characteristic of the mixture, and wherein at least one of the surfactants is selected from the group consisting of:

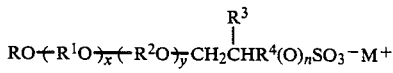

Wherein:
- R = a 6 to 16 carbon linear or branched alkyl radical or blend of alkyl radicals
- $R^1$ = ethyl or i-propyl group
- $R^2$ = ethyl or i-propyl group
- $R^3$ = OH when $R^4$ = $CH_2$, or H when $R^4$ is absent
- $R^4$ = $CH_2$ when $R^3$ = OH, or absent when $R^3$ = H
- M = sodium, potassium, or ammonium
- x = 0–9
- y = 0–9
- n = 0–1

(b) injecting the surfactant mixture solution into the reservoir;
(c) injecting carbon dioxide gas to displace the surfactant mixture solution within the reservoir, wherein the volumetric ratio of surfactant solution to gas is from about 2:1 to about 1:5;
(d) repeating steps (b) and (c) at least once; and
(e) displacing the carbon dioxide gas with a brine solution, to assist in the recovery of hydrocarbons at the production well.

16. The process of claim 15 wherein the reservoir is a sandstone reservoir and at least one of the surfactants is selected from the group consisting of:

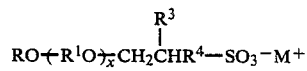

Wherein:
- R = an 8 or 9 carbon radical such as 2-ethylhexyl
- $R^1$ = ethyl group
- $R^3$ = OH when $R^4$ = $CH_2$, or when $R^4$ is absent
- $R^4$ = $CH_2$ when $R^3$ = OH, or absent when $R^3$ = H
- M = sodium, potassium, or ammonium
- x = 2–5.

17. A process for recovering oil from a reservoir, penetrated by at least one injection well and one production well, comprising:
(a) formulating two aqueous surfactant solutions wherein the first surfactant solution contains surfactant that is present in the solution at a concentration that is more than its critical micelle concentration and wherein the second surfactant solution contains surfactant that is present in the solution at a concentration that is less than its critical micelle concentration;
(b) injecting the first surfactant solution into the reservoir;
(c) injecting a gas into the reservoir;
(d) injecting the second surfactant solution into the reservoir; and
(e) injecting the gas into the reservoir to displace the second surfactant solution within the reservoir to assist in the recovery of hydrocarbons at the production well.

18. The process of claim 17 wherein the second surfactant is selected from the group consisting of:

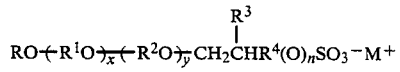

Wherein:
- R = a 6 to 16 carbon linear or branched alkyl radical or blend of alkyl radicals
- $R^1$ = ethyl or i-propyl group
- $R^2$ = ethyl or i-propyl group
- $R^3$ = OH when $R^4$ = $CH_2$, or H when $R^4$ is absent
- $R^4$ = $CH_2$ when $R^3$ = OH, or absent when $R^3$ = H
- M = sodium, potassium, or ammonium
- x = 0–9
- y = 0–9
- n = 0–1.

19. The process of claim 17 wherein steps (d) and (e) are repeated at least once.

20. The process of claim 19 wherein the volumetric ratio of second surfactant solution to gas is from about 2:1 to about 1:5.

21. The process of claim 17 wherein the reservoir is a sandstone reservoir and the second surfactant is selected from the group consisting of:

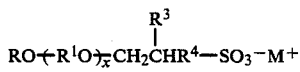

Wherein:
R=an 8 or 9 carbon radical such as 2-ethylhexyl
$R^1$=ethyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=2-5.

22. The process of claim 17 wherein step (e) is followed by displacing the gas with a brine solution.

23. A process for recovering oil from a reservoir, penetrated by at least one injection well and one production well, comprising:
(a) formulating two aqueous surfactant solutions wherein the first surfactant solution contains surfactant that is present in the solution at a concentration that is more than its critical micelle concentration and wherein the second surfactant solution contains surfactant that is present in the solution at a concentration that is less than its critical micelle concentration, and wherein the second surfactant is selected from the group consisting of:

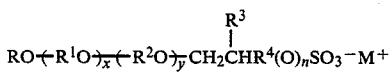

Wherein:
R=a 6 to 16 carbon linear or branched alkyl radical or blend of alkyl radicals
$R^1$=ethyl or i-propyl group
$R^2$=ethyl or i-propyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=0-9
y=0-9
n=0-1.

(b) injecting the first surfactant solution into the reservoir;
(c) injecting carbon dioxide gas into the reservoir;
(d) injecting the second surfactant solution into the reservoir;
(e) injecting the carbon dioxide gas into the reservoir to displace the second surfactant solution within the reservoir;
(f) repeating steps (d) and (e) at least once, wherein the volumetric ratio of second surfactant solution to carbon dioxide gas is from about 2:1 to about 1:5; and
(g) displacing the carbon dioxide gas with a brine solution, to assist in the recovery of hydrocarbons at the production well.

24. The process of claim 23 wherein the reservoir is a sandstone reservoir and the second surfactant is selected from the group consisting of:

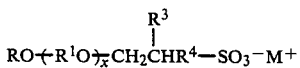

Wherein:
R=an 8 or 9 carbon radical such as 2-ethylhexyl
$R^1$=ethyl group
$R^3$=OH when $R^4$=$CH_2$, or H when $R^4$ is absent
$R^4$—$CH_2$ when $R^3$=OH, or absent when $R^3$=H
M=sodium, potassium, or ammonium
x=2-5.

25. A process for recovering oil from a reservoir, penetrated by at least one injection well and one production well, comprising:
(a) formulating an aqueous surfactant solution such that the surfactant is present in the solution at a concentration less than its critical micelle concentration;
(b) injecting the surfactant solution into the reservoir;
(c) injecting carbon dioxide gas into the reservoir after injection of the surfactant solution; and
(d) displacing the carbon dioxide gas with a brine solution, to assist in the recovery of hydrocarbons at the production well, wherein the volumetric ratio of brine plus surfactant solution to carbon dioxide gas is from about 5:1 to about 20:1.

26. The process of claim 25 wherein the surfactant is selected from the group consisting of:

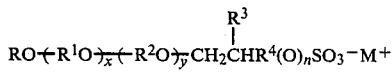

Wherein:
R=a 6 to 16 carbon linear or branched alkyl radical or blend of alkyl radicals
$R^1$=ethyl or i-propyl group
$R^2$=ethyl or i-propyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=0-9
y=0-9
n=0-1.

27. The process of claim 25 wherein the reservoir is a sandstone reservoir and the surfactant is selected from the group consisting of:

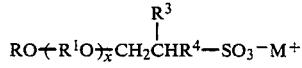

Wherein:
R=an 8 or 9 carbon radical such as 2-ethylhexyl
$R^1$=ethyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=2-5.

28. A process for recovering oil from a reservoir, penetrated by at least one injection well and one production well, comprising:
(a) formulating an aqueous surfactant solution such that the surfactant is present in the solution at a concentration less than its critical micelle concentration, and wherein the surfactant is selected from the group consisting of:

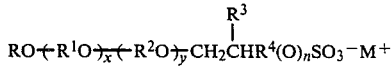

Wherein:

R=a 6 to 16 carbon linear or branched alkyl radical or blend of alkyl radicals
$R^1$=ethyl or i-propyl group
$R^2$=ethyl or i-propyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=0-9
y=0-9
n=0-1

(b) injecting the surfactant solution into the reservoir;
(c) injecting carbon dioxide gas into the reservoir after injection of the surfactant solution;
(d) repeating steps (b) and (c) at least once; and
(e) displacing the carbon dioxide gas with a brine solution, to assist in the recovery of hydrocarbons at the production well, wherein the volumetric ratio of brine plus surfactant solution to carbon dioxide gas is from about 5:1 to about 20:1.

29. The process of claim 28 wherein the reservoir is a sandstone reservoir and the surfactant is selected from the group consisting of:

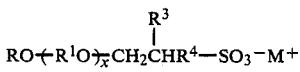

Wherein:
R=an 8 or 9 carbon radical such as 2-ethylhexyl
$R^1$=ethyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=2-5.

30. A process for recovering oil from a reservoir, penetrated by at least one injection well and one production well, comprising:

(a) formulating a solution containing a mixture of at least two surfactants, wherein the mixture of surfactants is present in the solution at a concentration that is less than the critical micelle concentration characteristic of the mixture;
(b) injecting the surfactant mixture solution into the reservoir;
(c) injecting carbon dioxide gas into the reservoir after injection of the surfactant mixture solution; and
(d) displacing the carbon dioxide gas through the reservoir with a brine solution, wherein the volumetric ratio of surfactant mixture solution plus brine solution to carbon dioxide gas is from about 5:1 to about 20:1.

31. The process of claim 30 wherein at least one of the surfactants is selected from the group consisting of:

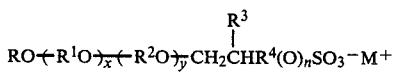

Wherein:
R=a 6 to 16 carbon linear or branched alkyl radical or blend of alkyl radicals
$R^1$=ethyl or i-propyl group
$R^2$=ethyl or i-propyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=0-9
y=0-9
n=0-1.

32. The process of claim 30 wherein the reservoir is a sandstone reservoir and at least one of the surfactants is selected from the group consisting of:

Wherein:
R=an 8 or 9 carbon radical such as 2-ethylhexyl
$R^1$=ethyl group
$R^3$=OH when $R^4$=$CH_2$, or H when $R^4$ is absent
$R^4$=$CH_2$ when $R^3$=OH, or absent when R=$H$
M=sodium, potassium, or ammonium
x=2-5.

33. A process for recovering oil from a reservoir, penetrated by at least one injection well and one production well, comprising:

(a) formulating a solution containing a mixture of at least two surfactants, wherein the mixture of surfactants is present in the solution at a concentration that is less than the critical micelle concentration characteristic of the mixture, wherein at least one of the surfactants is selected from the group consisting of:

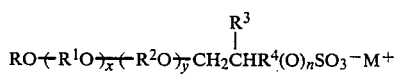

Wherein:
R=a 6 to 16 carbon linear or branched alkyl radical or blend of alkyl radicals
$R^1$=ethyl or i-propyl group
$R^2$=ethyl or i-propyl group
$R^3$=OH when $R^4$=$CH_2$, or H when $R^4$ is absent
$R^4$=$CH_2$ when $R^3$=OH, or absent when $R^3$=H
M=sodium, potassium, or ammonium
x=0-9
y=0-9
n=0-1

(b) injecting the surfactant mixture solution into the reservoir;
(c) injecting carbon dioxide gas into the reservoir after injection of the surfactant mixture solution;
(d) repeating steps (b) and (c) at least once; and
(e) displacing the carbon dioxide gas through the reservoir with a brine solution, wherein the volumetric ratio of surfactant mixture solution plus brine solution to carbon dioxide gas is from about 5:1 to about 20:1.

34. The process of claim 33 wherein the reservoir is a sandstone reservoir and at least one of the surfactants is selected from the group consisting of:

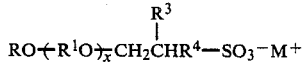

Wherein:
R=an 8 or 9 carbon radical such as 2-ethylhexyl
$R^1$=ethyl group
$R^3$=OH when $R^4$=$CH_2$, or H when $R^4$ is absent
$R^4$=$CH_2$ when $R^3$=OH, or absent when $R^3$=H
M=sodium, potassium, or ammonium $x = 2-5$.

35. A process for recovering oil from a reservoir, penetrated by at least one injection well and one production well, comprising:
   (a) formulating two aqueous surfactant solutions wherein the first surfactant solution contains surfactant that is present in the solution at a concentration that is more than its critical micelle concentration and wherein the second surfactant solution contains surfactant that is present in the solution at a concentration that is less than its critical micelle concentration;
   (b) injecting the first surfactant solution into the reservoir;
   (c) injecting carbon dioxide gas into the reservoir;
   (d) injecting the second surfactant solution into the reservoir;
   (e) injecting the carbon dioxide gas into the reservoir; and
   (f) displacing the carbon dioxide gas within the reservoir with a brine solution, wherein the volumetric ratio of surfactant solution plus brine solution to carbon dioxide gas is from about 5:1 to about 20:1.

36. The process of claim 35 wherein the second surfactant is selected from the group consisting of:

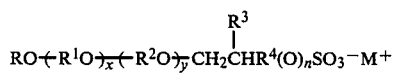

Wherein:
   R = a 6 to 16 carbon linear or branched alkyl radical or blend of alkyl radicals
   $R^1$ = ethyl or i-propyl group
   $R^2$ = ethyl or i-propyl group
   $R^3$ = OH when $R^4$ = $CH_2$, or H when $R^4$ is absent
   $R^4$ = $CH_2$ when $R^3$ = OH, or absent when $R^3$ = H
   M = sodium, potassium, or ammonium
   x = 0-9
   y = 0-9
   n = 0-1.

37. The process of claim 35 wherein the reservoir is a sandstone reservoir and the second surfactant is selected from the group consisting of:

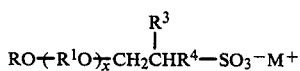

Wherein:
   R = an 8 or 9 carbon radical such as 2-ethylhexyl
   $R^1$ = ethyl group
   $R^3$ = OH when $R^4$ = $CH_2$, or H when $R^4$ is absent
   $R^4$ = $CH_2$ when $R^3$ = OH, or absent when $R^3$ = H
   M = sodium, potassium, or ammonium
   x = 2-5.

38. A process for recovering oil from a reservoir, penetrated by at least one injection well and one production well, comprising:
   (a) formulating two aqueous surfactant solutions wherein the first surfactant solution contains surfactant that is present in the solution at a concentration that is more than its critical micelle concentration and wherein the second surfactant solution contains surfactant that is present in the solution at a concentration that is less than its critical micelle concentration, and wherein the second surfactant is selected from the group consisting of:

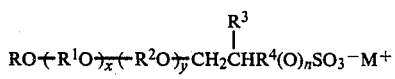

Wherein:
   R = a 6 to 16 carbon linear or branched alkyl radical or blend of alkyl radicals
   $R^1$ = ethyl or i-propyl group
   $R^2$ = ethyl or i-propyl group
   $R^3$ = OH when $R^4$ = $CH_2$, or H when $R^4$ is absent
   $R^4$ = $CH_2$ when $R^3$ = OH, or absent when $R^3$ = H
   M = sodium, potassium, or ammonium
   x = 0-9
   y = 0-9
   n = 0-1
   (b) injecting the surfactant mixture solution into the reservoir;
   (c) injecting carbon dioxide gas into the reservoir;
   (d) injecting the second surfactant solution into the reservoir;
   (e) injecting the carbon dioxide gas into the reservoir;
   (f) repeating steps (d) and (e) at least once; and
   (g) displacing the carbon dioxide gas within the reservoir with a brine solution, wherein the volumetric ratio of second surfactant solution plus brine solution to carbon dioxide gas is from about 5:1 to about 20:1.

39. The process of claim 38 wherein the reservoir is a sandstone reservoir and the second surfactant is selected from the group consisting of:

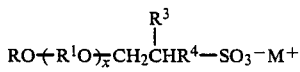

Wherein:
   R = an 8 or 9 carbon radical such as 2-ethylhexyl
   $R^1$ = ethyl group
   $R^3$ = OH when $R^4$ = $CH_2$, or H when $R^4$ is absent
   $R^4$ = $CH_2$ when $R^3$ = OH, or absent when $R^3$ = H
   M = sodium, potassium, or ammonium
   x = 2-5.

40. A process for recovering oil from a reservoir, penetrated by at least one injection well and one production well, comprising:
   (a) formulating an aqueous surfactant solution such that the surfactant is present in the solution at a concentration less than its critical micelle concentration, and wherein the surfactant is selected from the group consisting of:

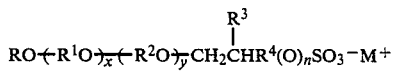

Wherein:
   R = a 6 to 16 carbon linear or branched alkyl radical or blend of alkyl radicals
   $R^1$ = ethyl or i-propyl group
   $R^2$ = ethyl or i-propyl group
   $R^3$ = OH when $R^4$ = $CH_2$, or H when $R^4$ is absent
   $R^4$ = $CH_2$ when $R^3$ = OH, or absent when $R^3$ = H
   M = sodium, potassium, or ammonium
   x = 0-9 y=0-9
n=0-1

(b) injecting the surfactant solution into the reservoir; and (c) injecting a gas to displace the surfactant solution through the reservoir to assist in the recovery of hydrocarbons at the production well.

41. A process for recovering oil from a reservoir, penetrated by at least one injection well and one production well, comprising:

(a) formulating a solution containing a mixture of at least two surfactants, wherein the mixture of surfactants is present in the solution at a concentration that is less than the critical micelle concentration characteristic of the mixture, and wherein at least one of the surfactants is selected from the group consisting of:

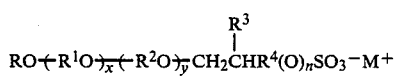

Wherein:
R = a 6 to 16 carbon linear or branched alkyl radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1

(b) injecting the surfactant mixture solution into the reservoir; and (c) injecting a gas to displace the surfactant mixture solution through the reservoir to assist in the recovery of hydrocarbons at the production well.

42. A process for recovering oil from a reservoir, penetrated by at least one injection well and one production well, comprising:

(a) formulating an aqueous surfactant solution such that the surfactant is present in the solution at a concentration less than its critical micelle concentration, and wherein the surfactant is selected from the group consisting of:

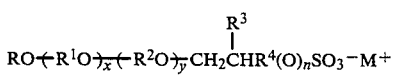

Wherein:
R = a 6 to 16 carbon linear or branched alkyl radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1

(b) injecting the surfactant solution into the reservoir;

(c) injecting carbon dioxide gas into the reservoir after injection of the surfactant solution; and (d) displacing the carbon dioxide gas with a brine solution, to assist in the recovery of hydrocarbons at the production well, wherein the volumetric ratio of brine plus surfactant solution to carbon dioxide gas is from about 5:1 to about 20:1.

43. A process for recovering oil from a reservoir, penetrated by at least one injection well and one production well, comprising:

(a) formulating a solution containing a mixture of at least two surfactants, wherein the mixture of surfactants is present in the solution at a concentration that is less than the critical micelle concentration characteristic of the mixture, and wherein at least one of the surfactants is selected from the group consisting of:

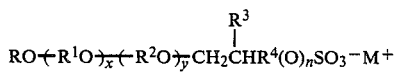

Wherein:
R = a 6 to 16 carbon linear or branched radical or blend of alkyl radicals
$R^1$ = ethyl or i-propyl group
$R^2$ = ethyl or i-propyl group
$R^3$ = OH when $R^4$ = $CH_2$, or H when $R^4$ is absent
$R^4$ = $CH_2$ when $R^3$ = OH, or absent when $R^3$ = H
M = sodium, potassium, or ammonium
x = 0-9
y = 0-9
n = 0-1

(b) injecting the surfactant mixture solution into the reservoir;

(c) injecting carbon dioxide gas into the reservoir after injection of the surfactant mixture solution; and (d) displacing the carbon dioxide gas through the reservoir with a brine solution, wherein the volumetric ratio of surfactant mixture solution plus brine solution to carbon dioxide gas is from about 5:1 to about 20:1.

* * * * *